United States Patent [19]

Stolz et al.

[11] 4,007,875
[45] Feb. 15, 1977

[54] INSTALLATION FOR VENTING THE INTERIOR SPACE OF A MOTOR VEHICLE

[75] Inventors: Albert Stolz, Tubingen, Germany; Axel Stehle, Nanuet, N.Y.

[73] Assignee: Daimler-Benz Aktiengesellschaft, Germany

[22] Filed: Apr. 3, 1975

[21] Appl. No.: 564,920

[30] Foreign Application Priority Data

Apr. 6, 1974 Germany .............. 2416805

[52] U.S. Cl. .............. 237/12.3 A; 62/244; 55/385 B; 55/387; 98/2.11
[51] Int. Cl.² .............. B60H 1/02
[58] Field of Search .............. 98/2.11, 2.07, 2.01, 98/2, 33 A; 237/12.3 A; 55/385 B, 387; 62/244; 165/42

[56] References Cited

UNITED STATES PATENTS

| | | | |
|---|---|---|---|
| 2,203,477 | 6/1940 | Wahlberg | 98/2.01 |
| 3,103,154 | 9/1963 | Rosenfeld | 98/33 A X |
| 3,269,801 | 8/1966 | Boberg et al. | 98/2.11 X |
| 3,313,123 | 4/1967 | Ware | 62/93 X |
| 3,329,077 | 7/1967 | Grosso | 98/2.11 |
| 3,651,659 | 3/1972 | Nakao et al. | 98/2.11 X |
| 3,827,218 | 8/1974 | Settlemyer | 55/387 X |
| 3,883,637 | 5/1975 | Benedict | 98/2.11 X |
| 3,908,900 | 9/1975 | Smith | 98/33 A X |

*Primary Examiner*—William F. O'Dea
*Assistant Examiner*—William E. Tapolcai, Jr.
*Attorney, Agent, or Firm*—Craig & Antonelli

[57] ABSTRACT

An installation for ventilating the interior space of a passenger motor vehicle which includes air inlet and air discharge apertures terminating in the atmosphere, a fresh air channel leading from the air inlet aperture into the interior space, a fan and a one-piece or a multi-partite air filter insert arranged in the fresh air channel or channels and adapted to be traversed by the fresh air; at least one of the fresh air channels is thereby extended along a space readily accessible through a large continuous surface, such as the hat storage area normally disposed in front of and underneath the rear window whereby this air channel is enlarged housing-like within this area for accommodating the air filter insert and is equipped with an opening of large surface and adapted to be closed for the ready interchange of the air filter insert.

44 Claims, 3 Drawing Figures

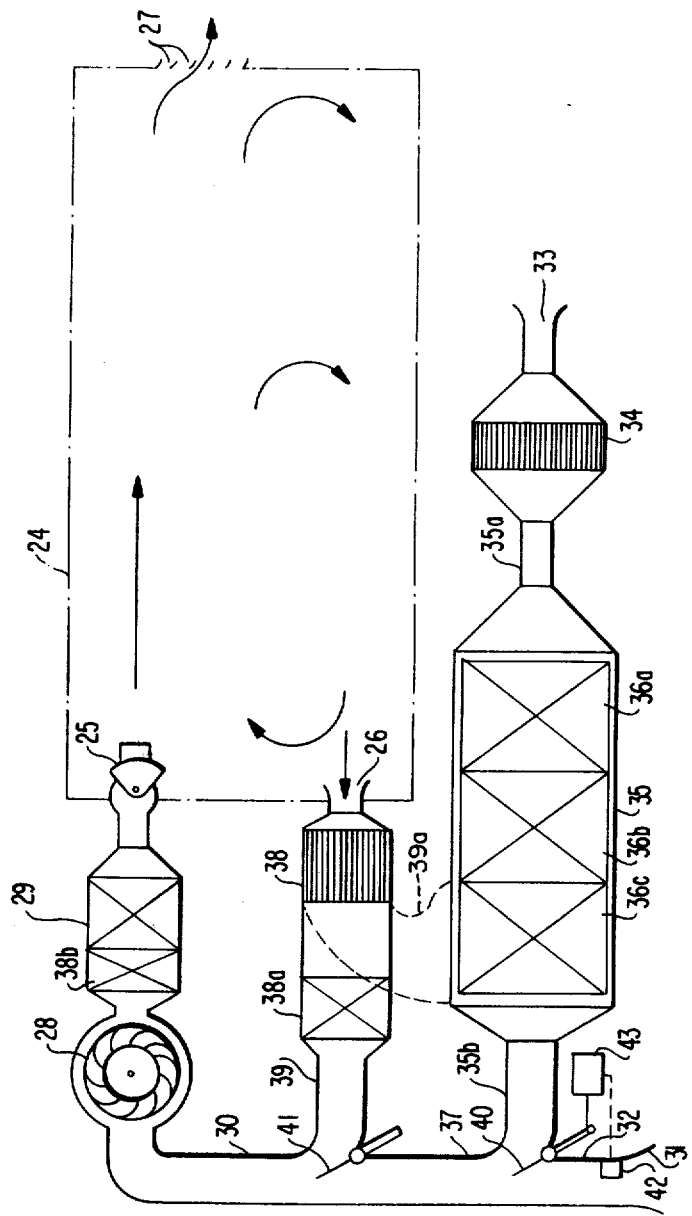

INSTALLATION FOR VENTING THE INTERIOR SPACE OF A MOTOR VEHICLE

The present invention relates to an installation for the ventilation of the interior space of a passenger motor vehicle with air inlet and air discharge apertures terminating in the atmosphere, with at least one air conduction channel (fresh air channel) leading from the air inlet aperture into the interior space, with fans and with at least one air filter insert holding back mechanical and/or chemical air contaminations, which filter insert may be in one piece or of multi-partite construction, is adapted to be traversed by the fresh air and is arranged in the fresh air channel or channels.

In the course of the increasing traffic density and the air contamination caused thereby, some proposals have been made to supply the interior space of a passenger motor vehicle at least in case of need with filtered air. In the realization of this concept, however, some problems arise which result from the occurring filter load. The filters, on the one hand should occupy as little space as possible (high filter load), yet on the other, the service/or replacement intervals should be as large as possible (small filter load). The one requirement precludes the other.

The present invention is concerned with the task to indicate approaches as to how both requirements can be properly taken into consideration in a practical manner. The underlying problems are solved according to the present invention in that at least one of the fresh air channels is extended along a hollow or free space readily accessible by way of a large continuous surface, especially under the hat storage or deposit surface disposed underneath the rear window and in that the fresh air channel is enlarged housing-like within this area for receiving the air filter insert and is provided with a large-surface opening adapted to be closed for the exchange of the air filter insert.

The space problem and the ready interchangeability are solved by the layout and extension of the fresh air channel along an accessible free space of large area; the filter load can be decreased with sufficient dimensions of the filter by making available a large space and thus the renewal intervals can be increased to acceptable lengths. An accommodating space for large air filters would, for example, be the mentioned space underneath the hat storage at the rear window. Another possibility may be, for example, underneath the engine hood where frequently an air-collecting box, i.e., a common air box is arranged.

Since the air filter is constructed as dry filter, it must be avoided that its length of life is impaired by moisture or humidity. It is therefore appropriate for purposes of avoiding moisture condensation out of the fresh air in the air filter, if a heat-exchanger for preheating the fresh air is arranged in the fresh air channel upstream of the air filter insert as viewed in the flow direction. This heat-exchanger warms up the air and together with the latter to filter the temperatures slightly above the point of condensation of the fresh air.

In order to be able to keep the windowpanes free of condensation especially in damp weather, large air quantities are required under certain circumstances which have to be fanned along the panes. In order to keep small the filter load notwithstanding large air quantities, it is appropriate, if a bypass line terminates in the fresh air channel preferably downstream of the air filter insert as viewed in the flow direction, which by-pass line is in communication with its other end with the vehicle interior space. A certain already clean air quantity which no longer loads the air filter, is removed from the interior space and again blown-in on the ventilating side and only a portion of the air which is altogether recirculated is renewed through the filter.

Since a large amount of moisture is supplied to the recirculated air by the exhaled air of the vehicle passengers or by clothing which is damp or wet due to rain, and since with a recirculation of the interior air, this moisture is not conducted again into the atmosphere, there exists the danger of a moisture enrichment of the interior air and of a condensation of the windowpanes. In order to avoid this, it is advantageous if interchangeable means for the moisture removal (desiccator or exsiccator) are arranged in the recirculation line which are adapted to be traversed by the recirculation air.

In order to be able to change the proportion in recirculated air to the entire ventilating air quantity either at will or according to the indication of a device detecting and determining the interior humidity and/or the outside contamination, it is appropriate if a variable throttling device at least partially closing the flow cross section is provided at the termination place of the recirculating line in the fresh air line or at least in one of these two channels.

In order not to permit the recirculated air to be enriched with odors stemming from the vehicle interior space, it is appropriate if in addition to a drier, also an odor filter is arranged in the recirculation line. A separate odor filter may be used for that purpose or the odor filter in the filter insert for filtering the externally sucked-in contaminated air may be used for that purpose. It is appropriate in this case if the odor filter is arranged as last filter in the filter housing as viewed in the flow direction and if the recirculating line terminates in the filter housing directly upstream of the odor filter.

Since frequently motor vehicles of the higher class are already equipped with air conditioning installations having a refrigerating machine and a cooling medium evaporator, the moisture decrease of the recirculated air may also take place in that surface cooled off below the point of condensation of the recirculated air, preferably if the evaporator of an air conditioning installation of the vehicle is placed into the flow path of the circulated air upstream of the heater radiator for the fresh air and recirculated air. The moisture contained in the air then precipitates at these cold surfaces and runs off. The air cooling which occurs thereby can again be eliminated by warming up the air in the heater-radiator.

In order to spare or save the filter in cases of clean outside air, it is advantageous if a by-pass channel bypassing the filter insert and terminating directly in the atmosphere, terminates in the fresh air line downstream of the air filter insert as viewed in the flow direction. It is thereby appropriate to provide within the area of the discharge place of the by-pass channel in the fresh air channel or at least in one of the two channels a variable throttling device at least partially closing the flow cross section and thereby enabling a shifting of the main stream. This throttling device may, as already indicated, be more or less far opened or closed either at will and/or according to the indication of a signal determined by an air contamination sensor of conventional type. With an air filter insert arranged within the rear area of the vehicle, the fresh air may be conducted through a hollow longitudinal girder or bearer of the vehicle frame and/or through the intermediate space between the inner and outer wheel box or casing of the rear wheel. In order to be able to better overcome the air resistances of the fresh air channels and of the air filter, a further fan supplying the fresh air through the air filter and the connecting line may be arranged additionally within the area of the air filter in addition to the feed fan or blower normally arranged in the front area of the vehicle.

Accordingly, it is an object of the present invention to provide an installation for venting the interior space of a passenger motor vehicle which avoids by simple means the aforementioned shortcomings and drawbacks encountered in the prior art.

Another object of the present invention resides in an installation for venting the interior space of a passenger motor vehicle which permits an effective ventilation of the interior space combined with filtering of contaminated fresh air in case of need.

A further object of the present invention resides in an installation for venting the interior space of a passenger motor vehicle which harmonizes the contradictory requirements for a high filter load due to a requirement for a small space of the filter and of a small filter load due to the desire for service and renewal intervals which are as long as possible.

Still a further object of the present invention resides in an installation for venting the interior space of a passenger motor vehicle with filtered fresh air, which solves the space requirement and interchangeability of the filter as well as the filter load and length of life of the filter in an effective and advantageous manner.

Still another object of the present invention resides in a venting system for passenger motor vehicles in which the length of life of the air filter constructed as dry filter is not impaired by possible moisture due to condensation in the fresh air.

A still further object of the present invention resides in an installation for ventilating the interior space of a passenger motor vehicle which excels by versatility and adaptability to the most varied conditions as regards air contamination, air moisture and comfort requirements of the passengers.

These and other objects, features and advantages of the present invention will become more apparent from the following description when taken in connection with the accompanying drawing which shows, for purposes of illustration only, two embodiments in accordance with the present invention, and wherein:

FIG. 3 is a schematic view illustrating a modified embodiment of a ventilating installation in accordance with the present invention.

Figure 1:
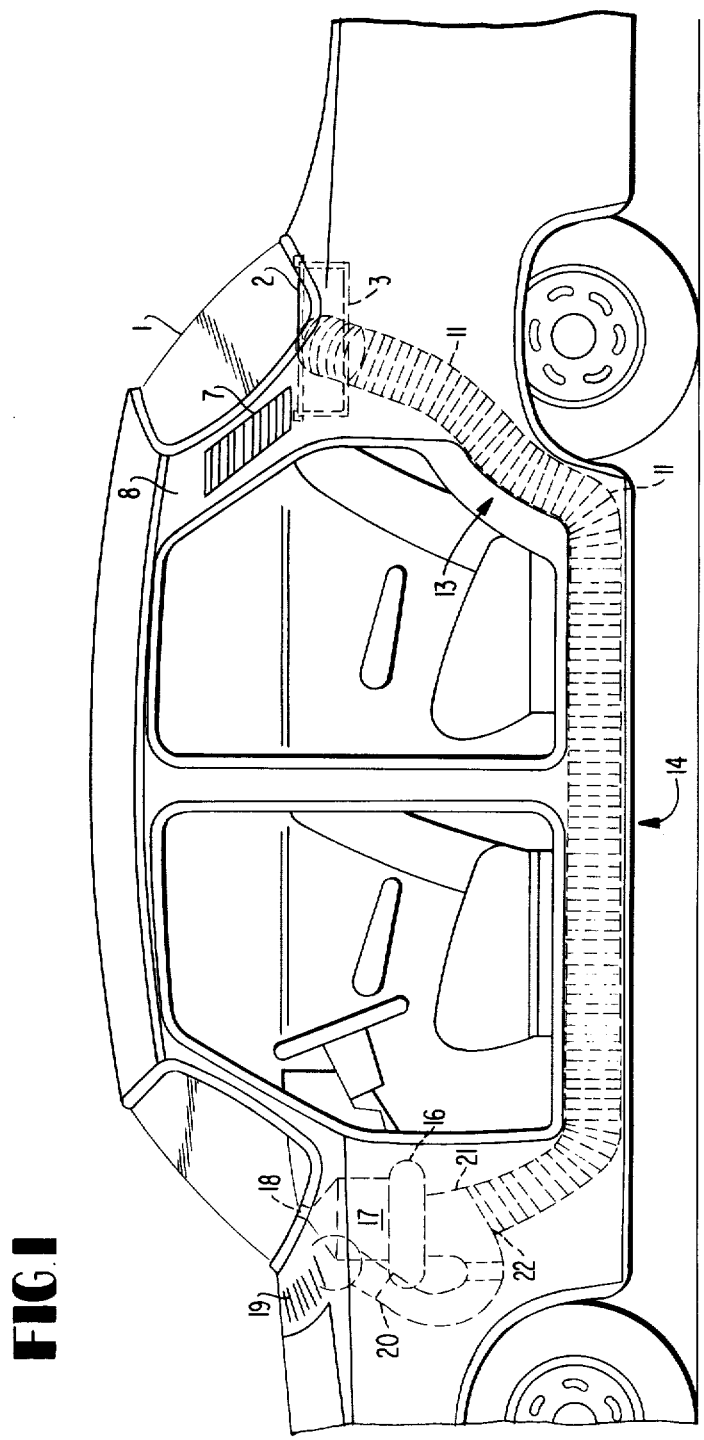
FIG. 1 is a somewhat schematic partial side view of a passenger motor vehicle equipped with a ventilating installation in accordance with the present invention.
Figure 2:
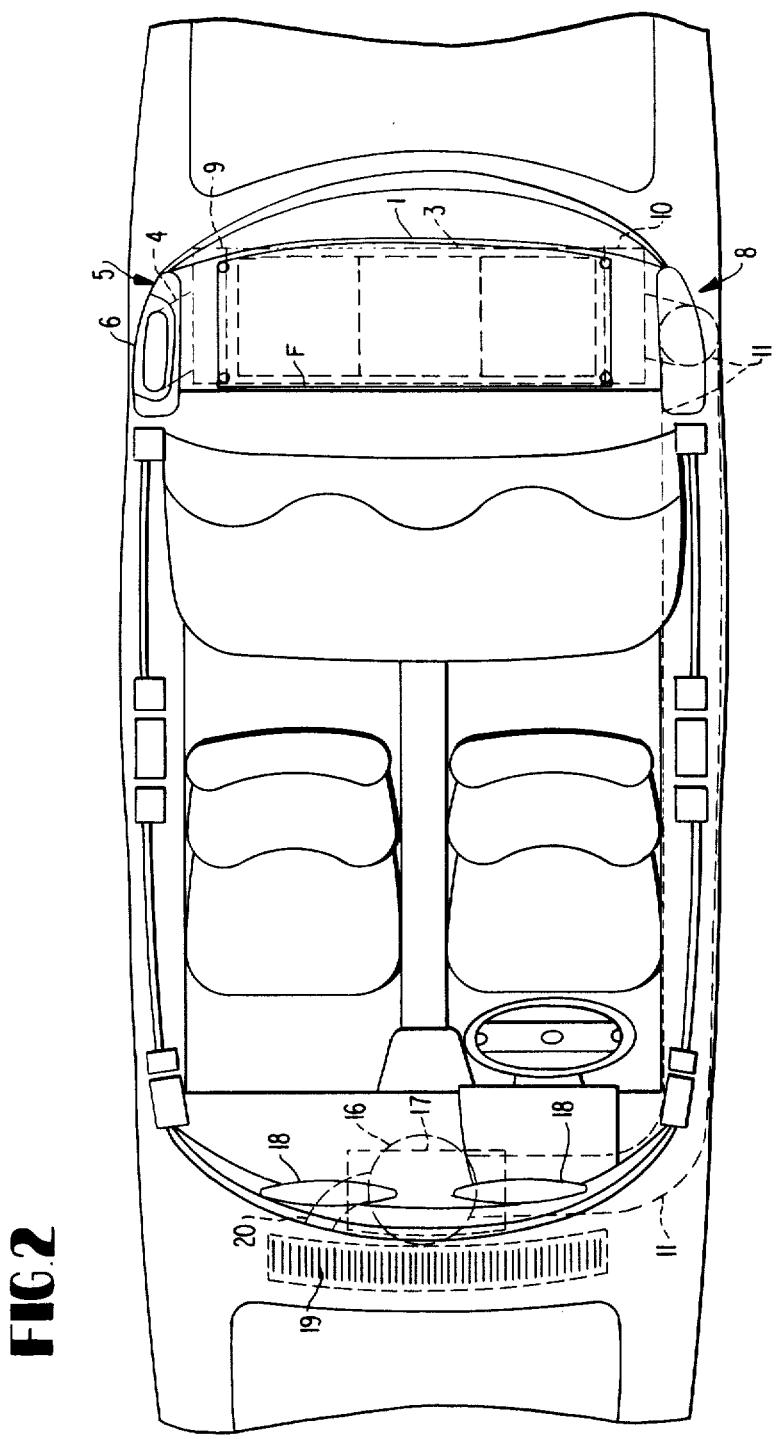
FIG. 2 is a somewhat schematic partial top plan view on the vehicle of FIG. 1 equipped with a ventilating installation in accordance with the present invention;.

Referring now to the drawing wherein like reference numerals are used throughout the various views to designate like parts, in the passenger motor vehicle illustrated in FIGS. 1 and 2, a housing 3 readily accessible over a large continuous surface is arranged underneath the window bench or hat deposit or storage space 2 disposed underneath the rear window 1. The house 3 is adapted to be opened over a large surface and adapted to be closed tightly by way of a conventional readily removable flap or the like F and is in communication by way of a line 4 with air apertures 6 (FIG. 2) arranged at the rear right roof column generally designated by reference numeral 5 —a corresponding arrangement is provided at the left roof column 8 recognizable in FIG. 1— and therewith is in communication with the atmosphere. A preheat-exchanger 9 is arranged at the housing 3 between the line 4 and the one end of the housing. The other end is provided with an intermediate fan or blower 10, from which extends a line 11 through the interior of the wheel box or casing 13 and of the floor lateral longitudinal girder 14 to the front section of the vehicle.

The installation described so far serves for the purpose of an air filtering of the ventilating air for the vehicle which is sucked in from the outside. The apertures 6 in the rear roof column 5 are intended as suction apertures. The air sucked in thereat is warmed up in case of need by way of the preheat-exchanger 9 above the point of condensation of the air and is conducted into the filter housing 3 in which is arranged a set of filters corresponding to the air contaminations. The air preheating above the point of condensation should avoid that the adjoining air filters are moistened or dampened by the sucked-in air and thus are impaired in their length of life. The intermediate fan 10 produces the pressure drop necessary for the sucking in and feeding of the air through the filter and the line 11 so that the filtered air is available in the front section of the vehicle without large pressure losses. The described arrangement was selected for reasons of the easy interchangeability of large-volume air filters with a relatively long length of life.

A controllable by-pass terminating in the vehicle passenger interior space may be arranged within the area of the hat storage space on the suction side of the intermediate fan, by way of which air can be sucked-in out of the interior of the vehicle eventually by way of an exsiccator of any conventional construction. This by-pass, of course, may also be arranged in the front section of the vehicle or of the passenger space. Such an internal by-pass protects the air filter notwithstanding a constant recirculating quantity in the passenger space.

The heating and air ventilating installation, properly speaking, of the vehicle, is arranged in the front section of the vehicle which includes a heater and ventilating fan 16, a heater radiator 17, air nozzles 18, an air inlet scoop or grill work 19, a fresh air line 20, a suction connection 21 and a control valve 22. The lines and nozzles leading into the vehicle interior space are adapted to be turned on and off at will in the usual manner and are shiftable among one another in the customary manner. The warm-up of the radiator and the forcible supply of the air by the fan 16 is also adapted to be selectively influenced at will.

By reason of the special illustrated arrangement and of the shifting valve 22, either filtered air sucked-in by way of line 11 or unfiltered air sucked-in by way of the line 20 can be sucked-in at the suction connection 21 of the fan 16; more particularly, depending on the position of the shifting valve or flap 22 any desired mixture ratio in filtered and unfiltered air can be adjusted at the fan inlet. This flap 22 can be actuated manually, i.e., at will and/or automatically by means of a contamination sensor.

A further embodiment of a ventilating installation according to the present invention is schematically indicated in FIG. 3. The passenger space 24 is indicated in dash and dot lines which includes an air inlet nozzle 25, a by-pass suction aperture 26 and air discharge apertures 27.

The air supplied by the fan 28 or by the aerodynamic pressure is forced into the vehicle passenger space 24 through the selectively cold or warmed-up radiator 29. The air reaching the suction connection 30 of the fan 28 may reach the same pretreated in different ways and correspondingly in different conditions.

On the one hand, the air initially may reach a point upstream of the fan 28 in the suction connection 30 in the condition in which it exists in the atmosphere surrounding the vehicle, i.e., non-filtered, by way of the inlet apertures 31 terminating directly in the atmosphere and by way of the line 32. Furthermore, the possibility exists that outside air flows in by way of the suction aperture 33, the preheat-exchanger 34 and the set of air filters 36a, 36b and 36c arranged in the housing-like line enlargement 35, in filtered condition into the common line 37 passing over into the suction line 30. Finally, interior air in dried condition can reach the point upstream of the fan 28 by way of the opening 26, the interchangeable moisture remover 38 (exsiccator) and the odor filter 38a and through the line 39. In lieu of this air path, also an air conduction of the recirculated air may take place through the exsiccator 38 and the odor filter 36c arranged in last place within the filter set by way of a line 39a.

By reason of the shifting flaps or valves 40 and 41, the described inflow paths may be selected individually or in predetermined pairing. One will open the flap 41 for the more or less strong opening of the interior by-pass 26, 38, 39, if a particularly large amount of recirculated air is required for keeping the windowpanes free from condensation, i.e. if the tendency of a condensation of the windows exists. To filter constantly such a quantity of air in a contaminated surrounding would load very strongly the air filters 36a to 36c and would impair their length of life. Consequently, the recirculating velocity of the interior air is increased in the illustrated manner by the recirculation and drying of the returned air without subjecting the air filters to any load.

The outside by-pass 31, 32 can be opened by means of the other shifting flap 40 which opens an air supply past the air filters 36a to 36b, i.e., in by-passing relationship to the latter. One will select this possibility of the air supply if the atmospheric air of the vehicle is clean and need not be filtered. Since the air soiling or contamination can be measured, for example, by an air contamination sensor 42 arranged in the line 32, the shifting flap 40 of the outside by-pass protecting the filter may also be adjusted automatically by an actuating installation 43 controlled or actuated by a signal of the sensor 42. This operative connection between the sensor 42, the actuating installation 43 and the flap 40 is such that with a contaminated air, the flap 40 is pivoted toward the left in the sense of a closing of the outside by-pass, and with a clean air in the line 32, toward the right in the opening sense. An air contamination sensor may also be arranged in the line section 37 which determines the result of the air filtering and which also closes the outside by-pass with an increasing contamination and vice-versa.

In lieu of or in addition to the exsiccator 38, cold surfaces 38b which are cooled off below the point of condensation of the recirculated air, may be arranged in the recirculating line preferably directly upstream of the heater radiator 29; this may be, for example, the cooling medium evaporator of the vehicle air-conditioning installation. The air moisture condenses at the cold surfaces and can then be conducted away.

While we have shown and described two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An installation for ventilating the interior space of a passenger motor vehicle which includes air inlet and air discharge aperture means terminating in the atmosphere, at least one fresh air channel means leading from the air inlet aperture means into the interior space, fan means and at least one air filter insert means arranged in the fresh air channel means and adapted to be traversed by fresh air for filtering at least one of mechanical and chemical air contaminations, characterized in that at least one air channel means is extended along a space means accessible by way of a large continuous surface means, said one air channel means being enlarged within the area of this space means in a housing-like manner for receiving the air filter insert means and being provided with an opening means for the exchange of the air filter insert means, said opening means being of relatively large surface and adapted to be closed, a heat-exchanger for preheating the fresh air in the fresh air channel means is arranged upstream of the air filter insert means, as viewed in the flow direction, and in that a recirculating line means terminates in the fresh air channel means downstream of the air filter insert means, as viewed in the flow direction.

2. An installation according to claim 1, characterized in that the air filter insert means is of one-piece construction.

3. An installation according to claim 1, characterized in that the air filter insert means is of multi-partite construction.

4. An installation according to claim 1, characterized in that said space means is a hollow space.

5. An installation according to claim 1, characterized in that said space means is a free space.

6. An installation according to claim 1, characterized in that said space means is located below the hat storage surface disposed underneath the rear window of the vehicle.

7. An installation according to claim 1, characterized in that interchangeable means for a moisture removal are arranged in the recirculating line means and are traversed by the recirculating air.

8. An installation according to claim 7, characterized in that a variable throttle means at least partly closing the flow cross section is provided at least in one of the two channel means consisting of the fresh air channel means and of the recirculating line means.

9. An installation according to claim 8, characterized in that said throttling means is arranged substantially at the discharge place of the recirculating line means in the fresh air channel means.

10. An installation according to claim 8, characterized in that a by-pass channel means by-passing the air filter insert means and terminating directly in the atmosphere, terminates in the fresh air channel means downstream of the air filter insert means, as viewed in the flow direction.

11. An installation according to claim 10, characterized in that a throttling means is provided in at least one of the two channel means consisting of the by-pass channel means and the fresh air channel means which at least partly closes the flow cross section and thereby enables a shifting of the main flow.

12. An installation according to claim 11, characterized in that a by-pass channel means by-passing the air filter insert means and terminating directly in the atmosphere, terminates in the fresh air channel means downstream of the air filter insert means, as viewed in the flow direction, a further throttling means is provided in at least one of the two channel means consisting of the by-pass channel means and the fresh air channel means which at least partly closes the flow cross-section and thereby enables a shifting of the main flow, and in that the last-mentioned throttling means is adapted to be selectively operated at will.

13. An installation according to claim 12, characterized in that the last-mentioned throttling means is operable to be actuated for closing and opening in accordance with signals determined by an air contamination sensor means.

14. An installation according to claim 11, with the air filter insert means arranged in the rear section of the passenger motor vehicle, characterized in that the fresh air channel means is conducted through a hollow longitudinal girder of the vehicle frame.

15. An installation according to claim 14, characterized in that the fresh air channel means is conducted through an intermediate space between an inner and outer wheel box of a rear wheel.

16. An installation according to claim 11, characterized in that an odor filter is arranged in the recirculating line means.

17. An installation according to claim 11, with a filter insert means for the fresh air arranged in a filter housing and including an odor filter, characterized in that the odor filter is arranged as last filter element in the filter housing as viewed in the flow direction and in that the recirculating line means terminates in the filter housing directly upstream of the odor filter.

18. An installation according to claim 11, characterized in that the means for decreasing the moisture in the recirculating line means are cooled surface means placed in the flow path of the recirculated air, arranged upstream of the heater radiator means and cooled below the condensation point of the recirculated air.

19. An installation according to claim 18, characterized in that the cooled surface means are formed by the evaporator of an air-condition installation.

20. An installation for ventilating the interior space of a passenger motor vehicle which includes air inlet and air discharge aperture means terminating in the atmosphere, at least one fresh air channel means leading from the air inlet aperture means into the interior space, fan means and at least one air filter insert means arranged in the fresh air channel means and adapted to be traversed by fresh air for filtering at least one of mechanical and chemical air contaminations, characterized in that at least one air channel means is extended along a space means accessible by way of a large continuous surface means, said one air channel means being enlarged within the area of this space means in a housing-like manner for receiving the air filter insert means and being provided with an opening means for the exchange of the air filter insert means, said opening means being of relatively large surface and adapted to be closed, a heat-exchanger for preheating the fresh air in the fresh air channel means is arranged upstream of the air filter insert means, as viewed in the flow direction, a recirculating line means has a first end terminating in the fresh air channel means, with a second end thereof communicating with the vehicle interior space, interchangeable means for a moisture removal are arranged in the recirculating line means and are traversed by the recirculating air, a variable throttle means at least partly closing the flow cross-section is provided at least in one of the two channel means consisting of the fresh air channel means and of the recirculating line means, a by-pass channel means by-passing the air filter insert means and terminating directly in the atmosphere, terminates in the fresh air channel means downstream of the air filter insert means as viewed in the flow direction, a further throttling means for partly closing the flow cross-section and enabling a shifting of the main flow is arranged within the area of a discharge of the by-pass channel means in the fresh air channel means.

21. An installation for ventilating the interior space of a passenger motor vehicle which includes air inlet and air discharge aperture means terminating in the atmosphere, at least one fresh air channel means leading from the air inlet aperture means into the interior space, fan means and at least one air filter insert means arranged in the fresh air channel means and adapted to be traversed by fresh air for filtering at least one of mechanical and chemical air contaminations, and with an air heater means arranged in the front section of the passenger motor vehicle and with air openings terminating in the vehicle passenger space in a front section of the passenger motor vehicle, characterized in that at least one air channel means is extended along a space means accessible by way of a large continuous surface means, said one air channel means being enlarged within the area of this space means in a housing-like manner for receiving the air filter insert means and being provided with an opening means for the exchange of the air filter insert means, said opening means being of relatively large surface and adapted to be closed, a heat-exchanger for preheating the fresh air in the fresh air channel means is arranged upstream of the air filter insert means, as viewed in the flow direction, a recirculating line means is provided with one end terminating in the fresh air channel means and another end communicating with the vehicle interior space, interchangeable means for a moisture removal are arranged in the recirculating line means and are traversed by the recirculating air, a variable throttle means at least partly closing the flow cross-section is provided at least in one of the two channel means consisting of the fresh air channel means and of the recirculating line means, a by-pass channel means by-passing the air filter insert means and terminating directly in the atmosphere, terminates in the fresh air channel means downstream of the air filter insert means, as viewed in the flow direction, a further throttling means is provided in at least one of the two channel means consisting of the by-pass channel means and the fresh air channel means which at least partly closes the flow cross-section and thereby enables a shifting of the main valve, and in that a fan means forcing the air through the passenger space is arranged within the area of the air heater means, and in that a further fan means supplying the fresh air through the air filter insert means and a connecting line means forming part of the fresh air channel means is arranged within the area of the air filter insert means.

22. An installation for ventilating the interior space of a passenger motor vehicle which includes air inlet and air discharge aperture means terminating in the atmosphere, at least one fresh air channel means leading from the air inlet aperture means into the interior space, fan means and at least one air filter insert means arranged in the fresh air channel means and adapted to be traversed by fresh air for filtering at least one of mechanical and chemical air contaminations, characterized in that at least one air channel means is extended along a space means accessible by way of a large continuous surface means, said one air channel means being enlarged within the area of this space means in a housing-like manner for receiving the air filter insert means and being provided with an opening means for the exchange of the air filter insert means, said opening means being of relatively large surface and adapted to be closed, and in that a recirculating line means terminates in the fresh air channel means downstream of the air filter insert means, as viewed in the flow direction.

23. An installation according to claim 22, characterized in that interchangeable means for a moisture removal are arranged in the recirculating line means, and are traversed by the recirculating air.

24. An installation according to claim 22, characterized in that a variable throttle means at least partly closing the flow cross section is provided at least in one of the two channel means consisting of the fresh air channel means and of the recirculating line means.

25. An installation according to claim 24, characterized in that said throttling means is arranged substantially at the discharge place of the recirculating line means in the fresh air channel means.

26. An installation according to claim 22, characterized in that a by-pass channel means by-passing the air filter insert means and terminating directly in the atmosphere, terminates in the fresh air channel means downstream of the air filter insert means, as viewed in the flow direction.

27. An installation according to claim 26, characterized in that a throttling means is provided in at least one of the two channel means consisting of the by-pass channel means and the fresh air channel means which at least partly closes the flow cross section and thereby enables a shifting of the main flow.

28. An installation according to claim 22, with the air filter insert means arranged in the rear section of the passenger motor vehicle, characterized in that the fresh air channel means is conducted through a hollow longitudinal girder of the vehicle frame.

29. An installation according to claim 22, characterized in that the fresh air channel means is conducted through an intermediate space between an inner and outer wheel box of a rear wheel.

30. An installation according to claim 22, characterized in that an odor filter is arranged in the recirculating line means.

31. An installation according to claim 22, with a filter insert means for the fresh air arranged in a filter housing and including an odor filter, characterized in that the odor filter is arranged as last filter element in the filter housing as viewed in the flow direction and in that the recirculating line means terminates in the filter housing directly upstream of the odor filter.

32. An installation according to claim 22, characterized in that means for decreasing the moisture in the recirculating line means are cooled surface means placed in the flow path of the recirculated air, arranged upstream of a heater radiator means and cooled below the condensation point of the recirculated air.

33. An installation according to claim 32, characterized in that the cooled surface means are formed by the evaporator of an air-condition installation.

34. An installation for ventilating the interior space of a passenger motor vehicle which includes air inlet and air discharge aperture means terminating in the atmosphere, at least one fresh air channel means leading from the air inlet aperture means into the interior space, fan means and at least one air filter insert means arranged in the fresh air channel means and adapted to be traversed by fresh air for filtering at least one of mechanical and chemical air contaminations, characterized in that at least one air channel means is extended along a space means accessible by way of a large continuous surface means, said one air channel means being enlarged within the area of this space means in a housing-like manner for receiving the air filter insert means and being provided with an opening means for the exchange of the air filter insert means, said opening means being of relatively large surface and adapted to be closed, a by-pass channel means by-passing the air filter insert means and terminating directly in the atmosphere, terminates in the fresh air channel means downstream of the air filter insert means, as viewed in the flow direction, a throttling means is provided in at least one of the two channel means consisting of the by-pass channel means and the fresh air channel means which at least partly closes the flow cross-section and thereby enables a shifting of the main flow, and in that said last-mentioned throttling means is arranged within the area of the discharge of the by-pass channel means in the fresh air channel means.

35. An installation for ventilating the interior space of a passenger motor vehicle which includes air inlet and air discharge aperture means terminating in the atmosphere, at least one fresh air channel means leading from the air inlet aperture means into the interior space, fan means and at least one air filter insert means arranged in the fresh air channel means and adapted to be traversed by fresh air for filtering at least one of mechanical and chemical air contaminations, characterized in that at least one air channel means is extended along a space means accessible by way of a large continuous surface means, said one air channel means being enlarged within the area of this space in a housing-like manner for receiving the air filter insert means and being provided with an opening means for the exchange of the air filter insert means, said opening means being of relatively large surface and adapted to be closed, a by-pass channel means by-passing the air filter insert means and terminating directly in the atmosphere, terminates in the fresh air channel means downstream of the air filter insert means, as viewed in the flow direction, a throttling means is provided in at least one of the two channel means consisting of the by-pass channel means and the fresh air channel means which at least partly closes the flow cross-section and thereby enables a shifting of the main flow, and in that the last-mentioned throttling means is adapted to be selectively operated at will.

36. An installation for ventilating the interior space of a passenger motor vehicle which includes air inlet and air discharge aperture means terminating in the atmosphere, at least one fresh air channel means leading from the air inlet aperture means into the interior space, fan means and at least one air filter insert means arranged in the fresh air channel means and adapted to be traversed by fresh air for filtering at least one of mechanical and chemical air contaminations, characterized in that at least one air channel means is extended along a space means accessible by way of a large continuous surface means, said one air channel means being enlarged within the area of this space means in a housing-like manner for receiving the air filter insert means and being provided with an opening means for the exchange of the air filter insert means, said opening means being of relatively large surface and adapted to be closed, a by-pass channel means by-passing the air filter insert means and terminating directly in the atmosphere, terminates in the fresh air channel means downstream of the air filter insert means, as viewed in the flow direction, a throttling means is provided in at least one of the two channel means consisting of the by-pass channel means and the fresh air channel means which at least partly closes the flow cross-section and thereby enables a shifting of the main flow, and in that the last-mentioned throttling means is operable to be actuated for closing and opening in accordance with signals determined by an air contamination sensor means.

37. An installation for ventilating the interior space of a passenger motor vehicle which includes air inlet and air discharge aperture means terminating in the atmosphere, at least one fresh air channel means leading from the air inlet aperture means into the interior space, fan means and at least one air filter insert means arranged in the fresh air channel means and adapted to be traversed by fresh air for filtering at least one of mechanical and chemical contaminations, and with an air heater means arranged in the front section of the passenger motor vehicle and with air openings terminating in the vehicle passenger space in the front section of the passenger motor vehicle, characterized in that at least one air channel means is extended along a space means accessible by way of a large continuous surface means, said one air channel means being enlarged within the area of this space means in a housing-like manner for receiving the air filter insert means and being provided with an opening means for the exchange of the air filter insert means, said opening means being of relatively large surface and adapted to be closed, and in that a fan means forcing the air through the passenger space is arranged within the area of the air heater means and in that a further fan means supplying the fresh air through the air filter insert means and a connecting line means forming part of the fresh air channel means is arranged within the area of the air filter insert means.

38. An installation for ventilating the interior space of a passenger motor vehicle which includes air inlet and air discharge aperture means terminating in the atmosphere, at least one fresh air channel means leading from the air inlet aperture means into the interior space, at least one air filter insert means arranged in the fresh air channel means and adapted to be traversed by fresh air for filtering at least one of mechanical and chemical air to contaminations, characterized in that at least one air channel means is extended along a space means located below a hat storage surface disposed beneath a rear window of the vehicle, said one air channel means being enlarged within the area of this space means in a housing-like manner for receiving the air filter insert means and being provided with an opening means for the exchange of the air filter insert means, said opening means being of relatively large surface and adapted to be closed, a recirculating line means having one end terminating in said fresh air channel means and another end communicating with the vehicle interior space, moisture removal means are arranged in the recirculating line means and are traversed by the recirculating air so as to remove any moisture therefrom, and an odor filter means is arranged in said recirculating line means for removing odor from the air being recirculated in the motor vehicle.

39. An installation according to claim 35, characterized in that said air inlet aperture means are arranged at the rear of the motor vehicle.

40. An installation according to claim 39, characterized in that a by-pass channel means by-passing the air filter insert means and terminating directly in the atmosphere, terminates in the fresh air channel means downstream of the air filter insert means, as viewed in the flow direction.

41. An installation according to claim 39, characterized in that a throttling means is arranged within the area of a discharge of the by-pass channel means in the fresh air channel means for partly closing the flow cross-section and enabling a shifting of the main flow.

42. An installation according to claim 41, characterized in that the motor vehicle includes rear roof column means, and in that said air inlet aperture means are arranged at each rear roof column means.

43. An installation according to claim 38, characterized in that a by-pass channel means by-passing the air filter insert means and terminating directly in the atmosphere, terminates in the fresh air channel means downstream of the air filter insert means, as viewed in the flow direction.

44. An installation according to claim 43, characterized in that a throttling means is arranged within the area of a discharge of the by-pass channel means in the fresh air channel means for partly closing the flow cross-section and enabling a shifting of the main flow.

* * * * *